US012367095B1

(12) United States Patent
Sridharan et al.

(10) Patent No.: US 12,367,095 B1
(45) Date of Patent: *Jul. 22, 2025

(54) DEVICES, SYSTEMS, AND METHODS FOR OUT-OF-BAND DELIVERY OF ERROR REPORTS

(71) Applicant: Advanced Micro Devices, Inc., Santa Clara, CA (US)

(72) Inventors: Vilas Sridharan, Boxborough, MA (US); Hanbing Liu, Austin, TX (US); Balatripura S. Chavali, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 18/089,128

(22) Filed: Dec. 27, 2022

(51) Int. Cl.
*G06F 11/00* (2006.01)
*G06F 11/07* (2006.01)

(52) U.S. Cl.
CPC ...... *G06F 11/0784* (2013.01); *G06F 11/0721* (2013.01); *G06F 11/0787* (2013.01)

(58) Field of Classification Search
CPC ............. G06F 11/0784; G06F 11/0721; G06F 11/0787
See application file for complete search history.

(56) References Cited

U.S. PATENT DOCUMENTS

| | | | |
|---|---|---|---|
| 7,370,243 B1 | 5/2008 | Grohoski et al. | |
| 7,447,852 B1 | 11/2008 | Justiss | |
| 7,546,487 B2 * | 6/2009 | Marisetty | G06F 11/0706 714/10 |
| 10,574,509 B2 * | 2/2020 | Kondapi | G06F 11/0748 |
| 10,585,826 B2 * | 3/2020 | Jayasena | G06F 13/24 |
| 11,023,302 B2 * | 6/2021 | Thornley | G06F 11/0772 |
| 2007/0011507 A1 * | 1/2007 | Rothman | G06F 11/2736 714/E11.174 |
| 2010/0235688 A1 * | 9/2010 | Bennah | G06F 11/0706 714/57 |
| 2013/0339829 A1 | 12/2013 | Vargas et al. | |
| 2016/0055052 A1 * | 2/2016 | Hu | G06F 11/10 714/799 |
| 2017/0116103 A1 * | 4/2017 | Cencini | H04L 41/24 |
| 2017/0344414 A1 | 11/2017 | Raj et al. | |
| 2020/0371695 A1 * | 11/2020 | Gopal | G06F 3/0658 |
| 2021/0200618 A1 * | 7/2021 | Magro | G06F 3/0679 |
| 2022/0129350 A1 * | 4/2022 | Sharma | G06F 3/0619 |
| 2022/0318087 A1 | 10/2022 | Hong et al. | |
| 2023/0195568 A1 * | 6/2023 | Hong | G06F 11/073 714/764 |

OTHER PUBLICATIONS

International Search Report and Written Opinion from corresponding International Application No. PCT/US2023/086035, dated Apr. 30, 2024 (10 pages).

* cited by examiner

*Primary Examiner* — Elmira Mehrmanesh
(74) *Attorney, Agent, or Firm* — Greenberg Traurig, LLP

(57) ABSTRACT

An exemplary computing device comprises an in-band processor and an out-of-band controller. The exemplary computing device also comprises a machine check architecture that includes a pipeline and a plurality of error detectors. The error detectors are configured to detect errors that occur in a plurality of circuits and report the errors to the in-band processor and the out-of-band controller via the pipeline. Various other devices, systems, and methods are also disclosed.

20 Claims, 7 Drawing Sheets

DEVICES, SYSTEMS, AND METHODS FOR OUT-OF-BAND DELIVERY OF ERROR REPORTS

BACKGROUND

Machine check architectures are often used to report errors to operating systems running on processors. In some examples, an operating system running on a processor logs the errors and forwards a copy of the errors to an out-of-band controller (e.g., a baseboard management controller). This forwarding of the copy of errors constitutes out-of-band work for the operating system and/or processor, which can lead to performance degradation for the substantive in-band workload (e.g., user applications). The instant disclosure, therefore, identifies and addresses a need for additional and improved devices, systems, and methods for out-of-band delivery of error reports generated by machine check architectures.

BRIEF DESCRIPTION OF THE DRAWINGS

The accompanying drawings illustrate a number of exemplary implementations and are a part of the specification. Together with the following description, these drawings demonstrate and explain various principles of the instant disclosure.

Figure 1:
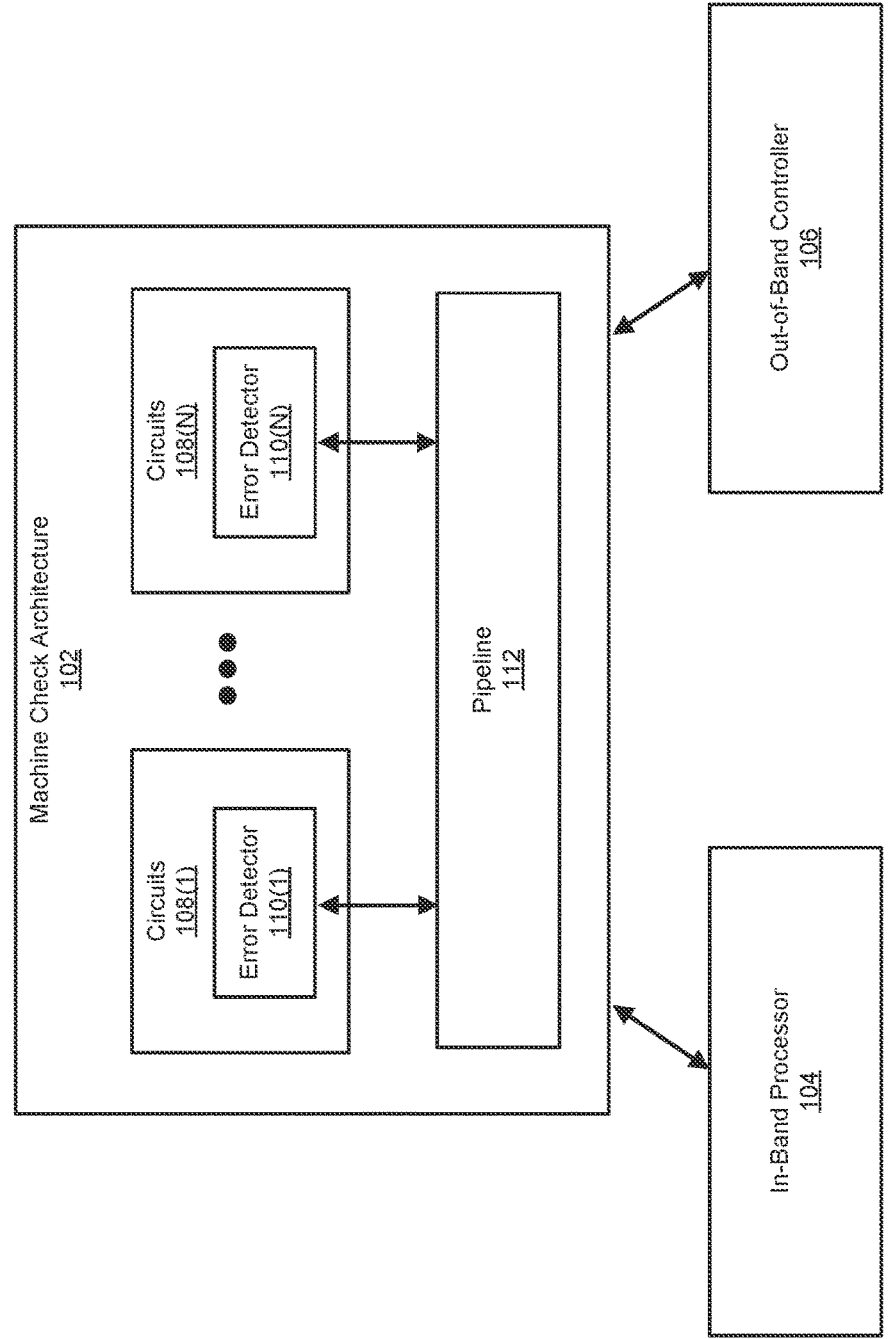
FIG. 1 is a block diagram of a portion of an exemplary computing device that facilitates out-of-band delivery of error reports according to one or more implementations of this disclosure.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the instant disclosure covers all modifications, equivalents, and alternatives falling within the scope of the appended claims.

DETAILED DESCRIPTION OF EXEMPLARY IMPLEMENTATIONS

The present disclosure describes various devices, systems, and methods for out-of-band delivery of error reports. In some examples, traditional delivery of error reports to an out-of-band controller (e.g., a baseboard management controller) can impair and/or degrade the performance of processors that forward the error reports. In addition to forwarding the error reports to the out-of-band controllers, such processors often elevate the reporting privileges above those of typical user applications, thus pushing the processors to operate in system management mode. Unfortunately, system management mode creates security vulnerabilities that can enable malware to gain control of the processors.

Moreover, machine check architectures often involve shadow registers that are accessible to both the operating system and the out-of-band controller for changing the state of the error reports. These shadow registers can create race conditions between the operating system and the out-of-band controller, potentially leading to undesirable results and/or sequencing. As will be described in greater detail below, the devices, systems, and methods described herein can enhance and/or augment machine check architectures so that reporting entities (e.g., memory controllers, central processing units, etc.) are able to send error reports to the processor and the out-of-band controller simultaneously.

For example, an enhanced block and/or circuit of a machine check architecture can constitute and/or represent a single unified interface that includes a fork creating two independent and/or parallel lanes for reporting errors to the processor and the out-of-band controller simultaneously. By doing so, the enhanced block and/or circuit of the machine check architecture facilitates error reporting to both the processor and the out-of-band controller without the need for the operating system running on the processor to expend in-band workload potential for out-of-band error reporting, thereby improving the performance of the user applications running on the processor. In addition, the enhanced block and/or circuit of the machine check architecture facilitates error reporting to both the processor and the out-of-band controller without elevating the processor to system management mode or creating race conditions between the operating system and the out-of-band controller, thereby improving the security of the processor and/or mitigating disjointed or mismatched states between the operating system and the out-of-band controller due to race conditions.

In some examples, a computing device comprises an in-band processor and an out-of-band controller. In such examples, the computing device also comprises a machine check architecture that includes a pipeline and a plurality of error detectors. In one example, the error detectors are configured to detect errors that occur in a plurality of circuits and report the errors to the in-band processor and the out-of-band controller via the pipeline.

In some examples, the pipeline comprises a unified lane configured to carry the error reports toward the in-band processor and the out-of-band controller. In such examples, the pipeline also comprises a fork configured to split the unified lane into a first lane and a second lane. In one example, the first lane carries a first copy of the error reports toward the in-band processor and a second lane that carries a second copy of the error reports toward the out-of-band controller.

In some examples, the machine check architecture comprises at least one in-band register configured to receive the first copy of the error reports via the first lane and store the first copy of the error reports for access by the in-band processor. In such examples, the machine check architecture also comprises at least one out-of-band register configured to receive the second copy of the error reports via the second lane and store the second copy of the error reports for access by the out-of-band controller.

In some examples, the in-band processor is configured to access the first copy of the error reports via the in-band register and is restricted from accessing the second copy of the error reports via the out-of-band register. Additionally or alternatively, the in-band processor comprises an operating system configured to obtain the first copy of the error reports from the in-band register.

In some examples, the out-of-band controller is configured to access the second copy of the error reports via the out-of-band register and is restricted from accessing the first copy of the error reports via the in-band registers. Additionally or alternatively, the out-of-band controller comprises a baseboard management controller and/or a system management unit communicatively coupled to a baseboard management controller.

In some examples, the system management unit is configured to access the second copy of the error reports via the out-of-band register and provide the second copy of the error reports to the baseboard management controller. In one example, the computing device also comprises a first integrated circuit that includes the in-band processor, the machine check architecture, and the system management unit as well as a second integrated circuit that is external to the first integrated circuit and includes the baseboard management controller.

In some examples, the in-band processor and the out-of-band controller are configured to make error-logging decisions independent of one another. Additionally or alternatively, the out-of-band controller is configured to instruct the machine check architecture to perform a specific action in response to a specific error detected in one of the circuits. For example, the specific action can include and/or represent triggering an interrupt that notifies the out-of-band controller of the specific error.

In some examples, a system comprises a first integrated circuit that includes an out-of-band controller and a second integrated circuit communicatively coupled the first integrated circuit. In such examples, the second integrated circuit comprises an in-band processor and a machine check architecture that includes a pipeline and a plurality of error detectors. In one example, the error detectors are configured to detect errors that occur in a plurality of circuits and report the errors to the in-band processor and the out-of-band controller via the pipeline.

In some examples, a method comprises creating an in-band processor and a machine check architecture. In such examples, the machine check architecture comprises a pipeline and a plurality of error detectors. In one example, the error detectors are configured to detect errors that occur in a plurality of circuits and report the errors to the in-band processor and an out-of-band controller via the pipeline. Additionally or alternatively, the method also comprises communicatively coupling the out-of-band controller to the machine check architecture.

The following will provide, with reference to FIGS. 1-5 and 7, detailed descriptions of exemplary devices, systems, and/or corresponding implementations for out-of-band delivery of error reports. Detailed descriptions of an exemplary method for out-of-band delivery of error reports will be provided in connection with FIG. 6.

FIG. 1 illustrates an exemplary computing device 100 that facilitates and/or supports out-of-band delivery of error reports. As illustrated in FIG. 1, exemplary computing device 100 includes and/or represents a machine check architecture 102, an in-band processor 104, and/or an out-of-band controller 106. In some examples, in-band processor 104 and/or out-of-band controller 106 are electrically and/or communicatively coupled to machine check architecture 102. In one example, machine check architecture 102 includes and/or represents a pipeline 112 and/or a plurality of circuits 108(1)-(N). In this example, circuits 108(1)-(N) include and/or represent error detectors 110(1)-(N), respectively. In certain implementations, error detectors 110(1)-(N) detect errors that occur in circuits 108(1)-(N), respectively, and/or report the errors to in-band processor 104 and out-of-band controller 106 via pipeline 112.

In some examples, machine check architecture 102 can include and/or represent a circuit, device, and/or mechanism that detects and/or reports errors to another circuit, device, and/or mechanism. For example, a system on a chip (SoC) can include and/or implement machine check architecture 102 as well as various processors and/or central processing unit (CPU) cores. In this example, machine check architecture 102 is configured and/or programmed to monitor hardware errors that occur in circuits 108(1)-(N), the processors or CPU cores implemented on the SoC, and/or other features or components of the SoC.

In some examples, circuits 108(1)-(N) include and/or represent hardware blocks and/or banks of machine check architecture 102. In one example, the hardware blocks and/or banks include and/or represent memory controllers and/or CPU cores. Additionally or alternatively, the hardware blocks and/or banks include and/or represent control registers and/or model-specific registers used to check for, detect, and/or record various hardware and/or machine errors. Examples of such errors include, without limitation, memory or cache errors, buffer errors, translation errors, parity errors, system bus errors, error-correcting code (ECC) faults, error detection and correction (EDAC) faults, communication errors, input/output (I/O) errors, portions of one or more of the same, combinations or variations of one or more of the same, and/or any other detectable errors.

Figure 7:
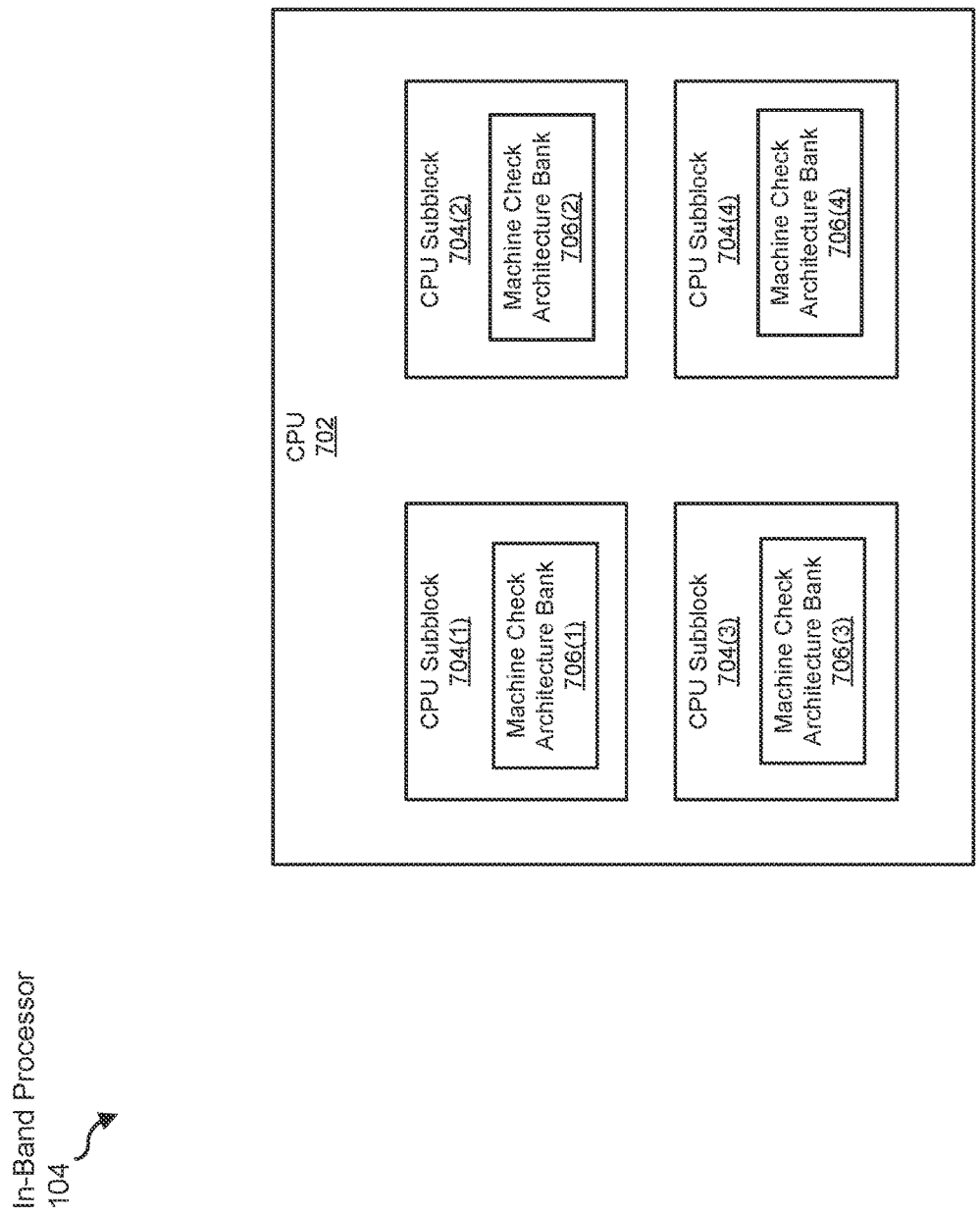
FIG. 7 is a block diagram of a portion of an exemplary in-band processor that implements banks of a machine check architecture according to one or more implementations of this disclosure.

In some examples, machine check architecture 102 can be instantiated and/or implemented as multiple banks across subblocks of one or more CPUs. For example, as illustrated in FIG. 7, in-band processor 104 can include and/or represent a CPU 702. In the example illustrated in FIG. 7, CPU 702 can include and/or represent at least CPU subblocks 704(1), 704(2), 704(3), and/or 704(4). In one example, CPU subblocks 704(1)-(4) can include and/or implement machine check architecture banks 706(1), 706(2), 706(3), and/or 706(4), respectively. Accordingly, machine check architecture 102 can be distributed across CPU subblocks 704(1)-(4), and/or machine check architecture banks 706(1)-(4) can log a specific group of errors per CPU subblock. In certain implementations, each CPU can include and/or represent between 3 and 10 machine check architecture instantiations distributed across corresponding CPU subblocks.

In some examples, in-band processor 104 can include and/or represent a hardware-implemented device and/or circuit capable of executing firmware, an operating system, and/or user applications. For example, in-band processor 104 can include and/or represent a graphics processing unit (GPU), a GPU core, a CPU, and/or a CPU core. In this example, in-band processor 104 can include and/or represent one of several processors (e.g., several x86 processors) implemented and/or disposed on an SoC. Additional examples of in-band processor 104 include, without limitation, parallel accelerated processors, tensor cores, microprocessors, microcontrollers, field-programmable gate arrays (FPGAs), application-specific integrated circuits (ASICs), integrated circuits, chiplets, portions of one or more of the same, variations or combinations of one or more of the same, and/or any other suitable in-band processor.

In-band processor 104 can implement and/or be configured with any of a variety of different architectures and/or microarchitectures. For example, in-band processor 104 can implement and/or be configured as a reduced instruction set computer (RISC) architecture. In another example, in-band processor 104 can implement and/or be configured as a complex instruction set computer (CISC) architecture. Additional examples of such architectures and/or microarchitectures include, without limitation, 16-bit computer architectures, 32-bit computer architectures, 64-bit computer architectures, x86 computer architectures, advanced RISC machine (ARM) architectures, microprocessor without interlocked pipelined stages (MIPS) architectures, scalable processor architectures (SPARCs), load-store architectures, portions of one or more of the same, combinations or variations of one or more of the same, and/or any other suitable architectures or microarchitectures.

In some examples, out-of-band controller 106 can include and/or represent a hardware-implemented device and/or circuit capable of controlling and/or modifying certain hardware features and/or components on an integrated circuit (e.g., an SoC that implements various CPU cores). In one example, out-of-band controller 106 can include and/or represent a device and/or circuit that is onboard (e.g., on-chip) and/or internal to an SoC that implements in-band processor 104. For example, out-of-band controller 106 can include and/or represent a system management unit implemented onboard and/or internal to the SoC. In another example, out-of-band controller 106 can include and/or represent a baseboard management controller implemented outside (e.g., off-chip) and/or external to the SoC that implements in-band processor 104. Additional examples of out-of-band controller 106 include, without limitation, microprocessors, microcontrollers, FPGAs, ASICs, integrated circuits, chiplets, portions of one or more of the same, variations or combinations of one or more of the same, and/or any other suitable out-of-band controller.

In some examples, the term "out-of-band" can refer to any component, circuit, and/or process that is dedicated to and/or supports the control plane (e.g., control data and/or firmware), the management plane, and/or data about the underlying device (e.g., an SoC). In contrast, the term "in-band" can refer to any component, circuit, and/or process that is dedicated to and/or supports the user plane (e.g., user data and/or user applications) running on and/or implemented by a processor (e.g., a CPU core of an SoC). In one example, an SoC's in-band workload can include and/or represent computing tasks performed for and/or in connection with user applications running on a processor, and the SoC's out-of-band workload can include and/or represent computing tasks performed for any other purpose besides utilization and/or consumption by such user applications.

Figure 2:
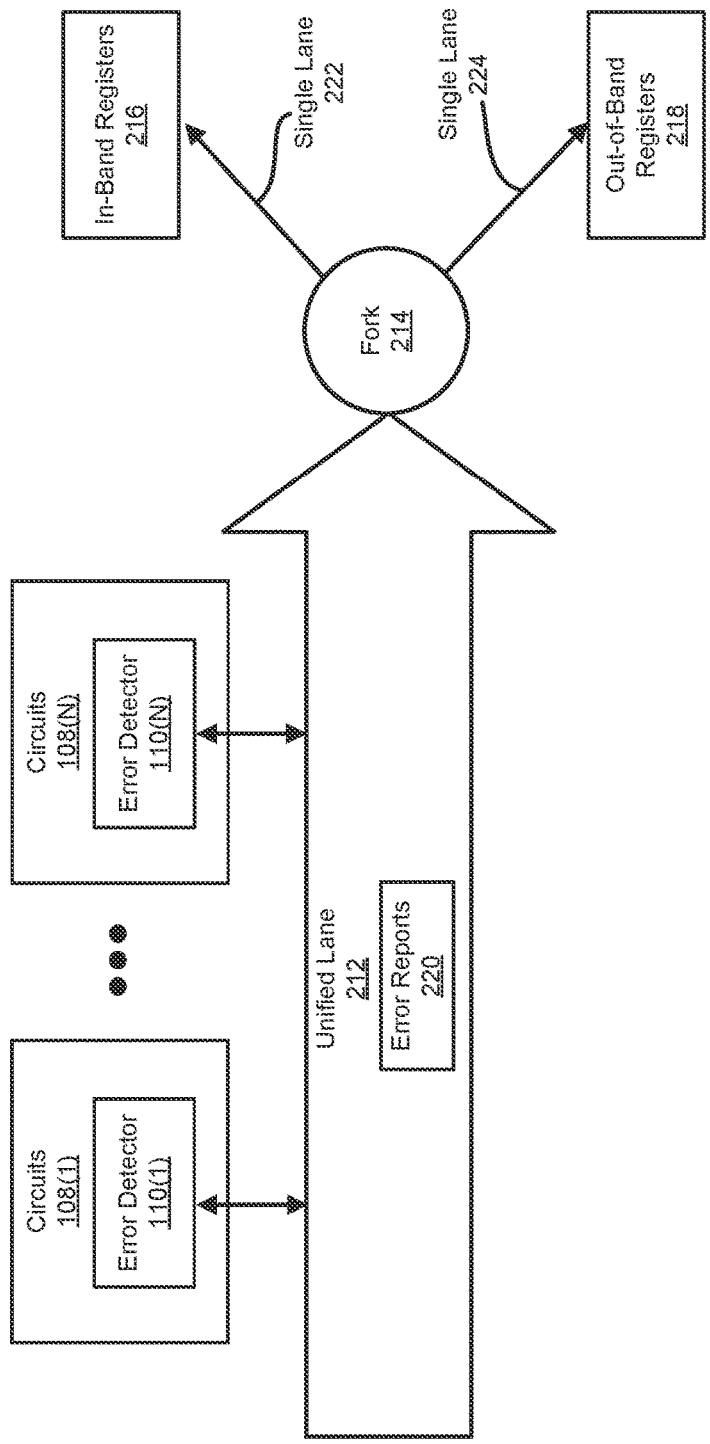
FIG. 2 is a block diagram of an exemplary machine check architecture that facilitates out-of-band delivery of error reports according to one or more implementations of this disclosure.

FIG. 2 illustrates an exemplary implementation of machine check architecture 102 that facilitates and/or supports out-of-band delivery of error reports. In some examples, machine check architecture 102 can include and/or represent certain components and/or features that perform and/or provide functionalities that are similar and/or identical to those described above in connection with FIG. 1. In one example, pipeline 112 of machine check architecture 102 includes and/or represents a unified lane 212, a fork 214, a single lane 222, and/or a single lane 224. In this example, unified lane 212 carries and/or transports error reports 220 toward both in-band processor 104 and out-of-band controller 106.

In some examples, unified lane 212 is electrically and/or communicatively coupled to fork 214. In such examples, unified lane 212 feeds and/or delivers error reports 220 to fork 214, which duplicates and/or copies error reports 220. For example, fork 214 splits and/or divides unified lane 212 into a single lane 222 and a single lane 224. In this example, single lane 222 carries and/or transports one copy of error reports 220 toward in-band processor 104, and single lane 224 carries and/or transports another copy of error reports 220 toward out-of-band controller 106.

In some examples, machine check architecture 102 also includes and/or represents one or more in-band registers 216 and/or out-of-band registers 218. In one example, single lane 222 can electrically and/or communicatively couple fork 214 to in-band registers 216. Additionally or alternatively, single lane 224 can electrically and/or communicatively couple fork 214 to out-of-band registers 218.

In some examples, error detectors 110(1)-(N) monitor for and/or detect certain errors in and/or via circuits 108(1)-(N), respectively. In such examples, one or more of error detectors 110(1)-(N) generate and/or issue error reports 220 in response to the detection of such errors. In one example, error detectors 110(1)-(N) can send and/or transmit error reports 220 toward both in-band processor 104 and out-of-band controller 106 via pipeline 112. For example, error reports 220 can traverse and/or travel from one or more of circuits 108(1)-(N) to fork 214 via unified lane 212. In this example, fork 214 can duplicate and/or copy error reports 220 for transmission to both in-band registers 216 and out-of-band registers 218. Accordingly, one copy of error reports 220 can traverse and/or travel from fork 214 to in-band registers 216 via single lane 222, and another copy of error reports 220 can traverse and/or travel from fork 214 to out-of-band registers 218 via single lane 224.

In some examples, in-band registers 216 receive one copy of error reports 220 and store that copy of error reports 220 for access by in-band processor 104. Additionally or alternatively, out-of-band registers 218 receive another copy of error reports 220 and store that copy of error reports 220 for access by out-of-band controller 106. By delivering copies of error reports 220 to both in-band registers 216 and out-of-band registers 218 via pipeline 112, machine check architecture 102 can enable out-of-band controller 106 to access and/or obtain a copy of error reports 220 without having in-band processor 104 forward the copy of error reports 220 to out-of-band controller 106, thereby mitigating and/or reducing the out-of-band work done by in-band processor 104, improving its performance or efficiency, and/or avoiding race conditions between in-band processor 104 and out-of-band controller 106. Moreover, by bypassing in-band processor 104 in delivering the copy of error reports 220 to out-of-band controller 106, machine check architecture 102 can prevent and/or avoid the need to push in-band processor 104 into system management mode, thereby mitigating and/or reducing the corresponding security vulnerabilities.

Figure 3:
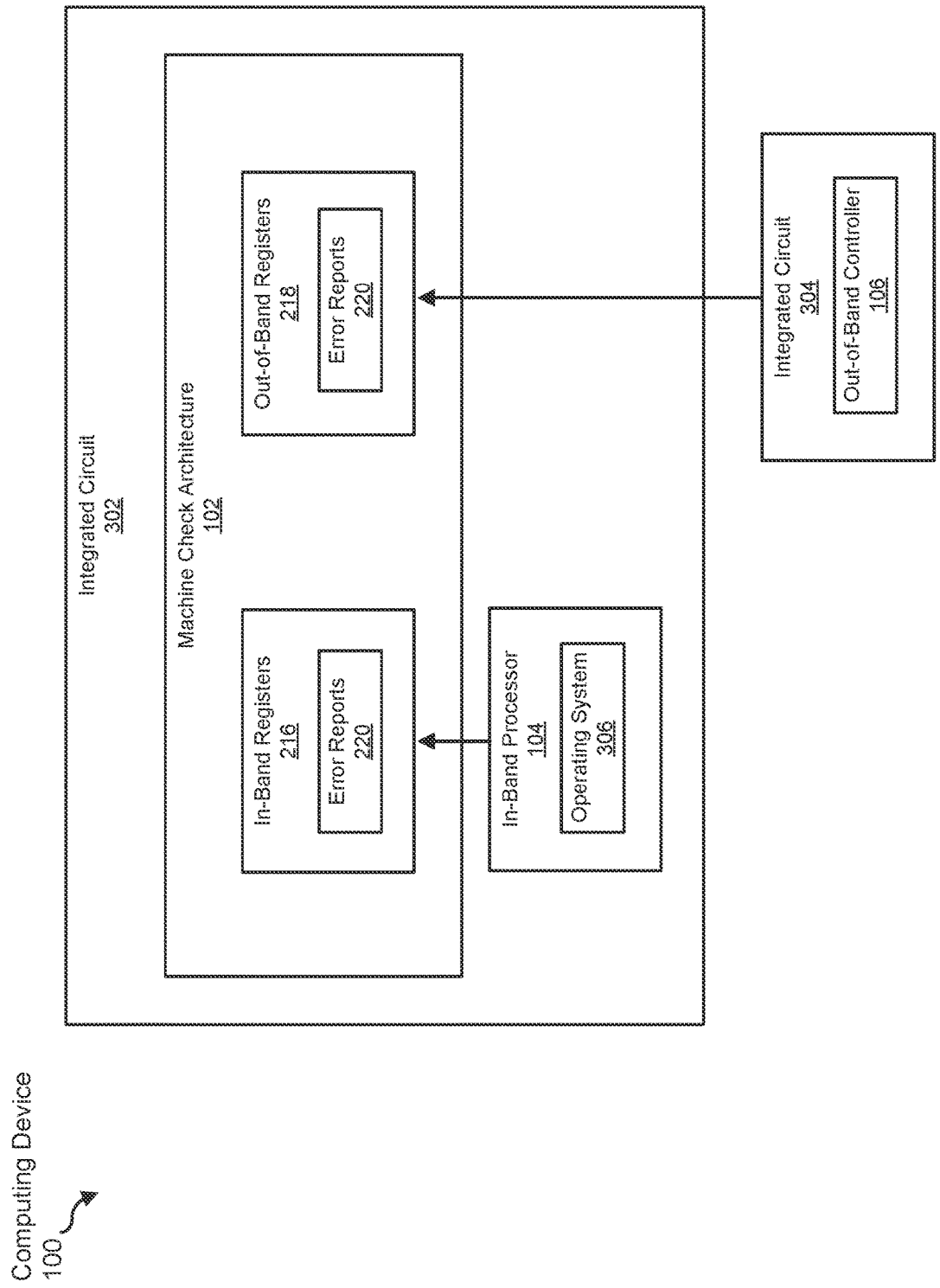
FIG. 3 is a block diagram of an exemplary computing device that facilitates out-of-band delivery of error reports according to one or more implementations of this disclosure.

FIG. 3 illustrates an exemplary implementation of computing device 100 that facilitates and/or supports out-of-band delivery of error reports. In some examples, computing device 100 can include and/or represent certain components and/or features that perform and/or provide functionalities that are similar and/or identical to those described above in connection with either of FIGS. 1 and 2. In one example, computing device 100 includes and/or represents an integrated circuit 302 and/or an integrated circuit 304 communicatively coupled to one another. In this example, integrated circuit 302 includes and/or represents machine check architecture 102 and/or in-band processor 104, and integrated circuit 304 includes and/or represents out-of-band controller 106. Accordingly, integrated circuit 304 is off-chip from and/or external to integrated circuit 302. However, integrated circuits 302 and 304 can be installed and/or applied to the same circuit board.

In some examples, integrated circuit 302 includes and/or represents an SoC with numerous CPU cores and machine check architecture 102. In one example, in-band processor 104 is on-chip and/or internal to the SoC, and out-of-band controller 106 is off-chip and/or external to the SoC. In this example, in-band processor 104 is able to access the copy of error reports 220 stored in in-band registers 216 but is restricted from accessing the copy of error reports 220 stored in out-of-band registers 218. For example, in-band processor 104 can implement and/or execute an operating system 306 that obtains, receives, and/or retrieves the copy of error reports 220 from in-band registers 216. Additionally or alternatively, out-of-band controller 106 is able to access the copy of error reports 220 stored in out-of-band registers 218 but is restricted from accessing the copy of error reports 220 stored in in-band registers 216.

In some examples, in-band processor 104 and out-of-band controller 106 can make error-logging decisions independent of one another. For example, in-band processor 104 can clear a certain flag (e.g., a status flag) in in-band registers 216 that remains set in out-of-band registers 218. Alternatively, out-of-band controller 106 can clear a certain flag (e.g., a status flag) in out-of-band registers 218 that remains set in in-band registers 216. Either way, such flag mismatches across in-band registers 216 and out-of-band registers 218 can cause in-band registers 216 and out-of-band registers 218 to log and/or disregard different errors from the same error reports. Accordingly, in-band processor 104 and out-of-band controller 106 can have independent control and/or programmability over their respective registers in machine check architecture 102.

Figure 4:
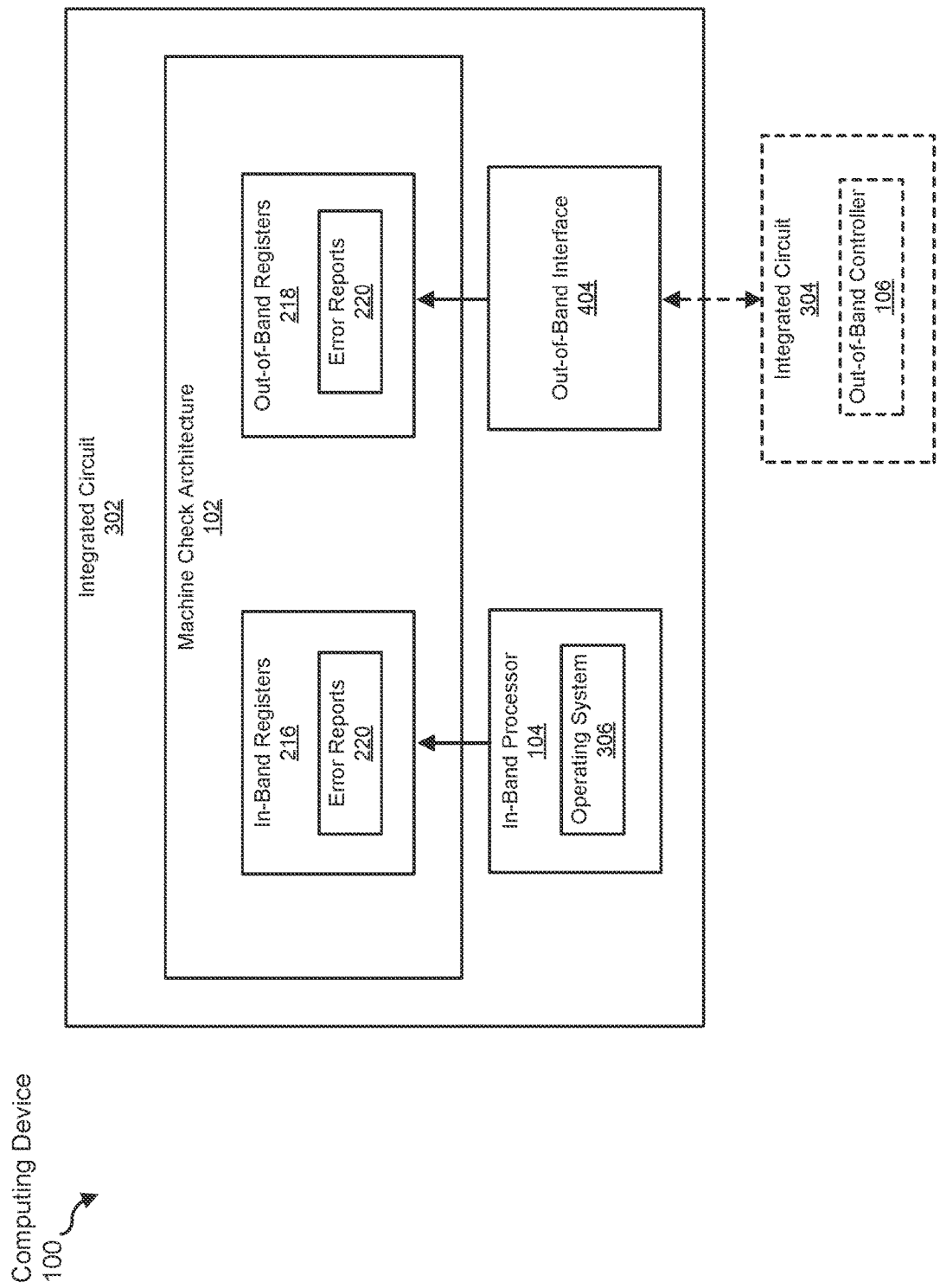
FIG. 4 is an illustration of an exemplary computing device that facilitates out-of-band delivery of error reports according to one or more implementations of this disclosure.

FIG. 4 illustrates another exemplary implementation of computing device 100 that facilitates and/or supports out-of-band delivery of error reports. In some examples, computing device 100 can include and/or represent certain components and/or features that perform and/or provide functionalities that are similar and/or identical to those described above in connection with any of FIGS. 1-3. As illustrated in FIG. 4, exemplary computing device 100 includes and/or represents integrated circuit 302 and/or integrated circuit 304 communicatively coupled to one another. In one example, integrated circuit 302 includes and/or represents machine check architecture 102, in-band processor 104, and/or an out-of-band interface 404. In this example, integrated circuit 304 includes and/or represents out-of-band controller 106 communicatively coupled to out-of-band interface 404, which facilitates access to the copy of error reports 220 stored in out-of-band registers 218 for out-of-band controller 106.

In some examples, out-of-band interface 404 can include and/or represent a system management unit that obtains, receives, and/or retrieves the copy of error reports 220 from out-of-band registers 218. Additionally or alternatively, out-of-band controller 106 can include and/or represent a baseboard management controller that interfaces and/or communicates with the system management unit. In one example, the baseboard management controller obtains, receives, and/or retrieves the copy of error reports 220 from the system management unit.

In some examples, out-of-band controller 106 and/or out-of-band interface 404 can instruct and/or direct machine check architecture 102 to perform one or more specific actions in response to specific errors identified and/or included in error reports 220. For example, out-of-band controller 106 and/or out-of-band interface 404 can program and/or configure out-of-band registers 218 to initiate and/or trigger a specific action in response to a specific error. In one example, the specific action can include and/or represent triggering an interrupt that notifies out-of-band controller 106 of the specific error. For example, out-of-band interface 404 can be programmed and/or configured to generate the interrupt that notifies out-of-band controller 106 of the specific error.

Figure 5:
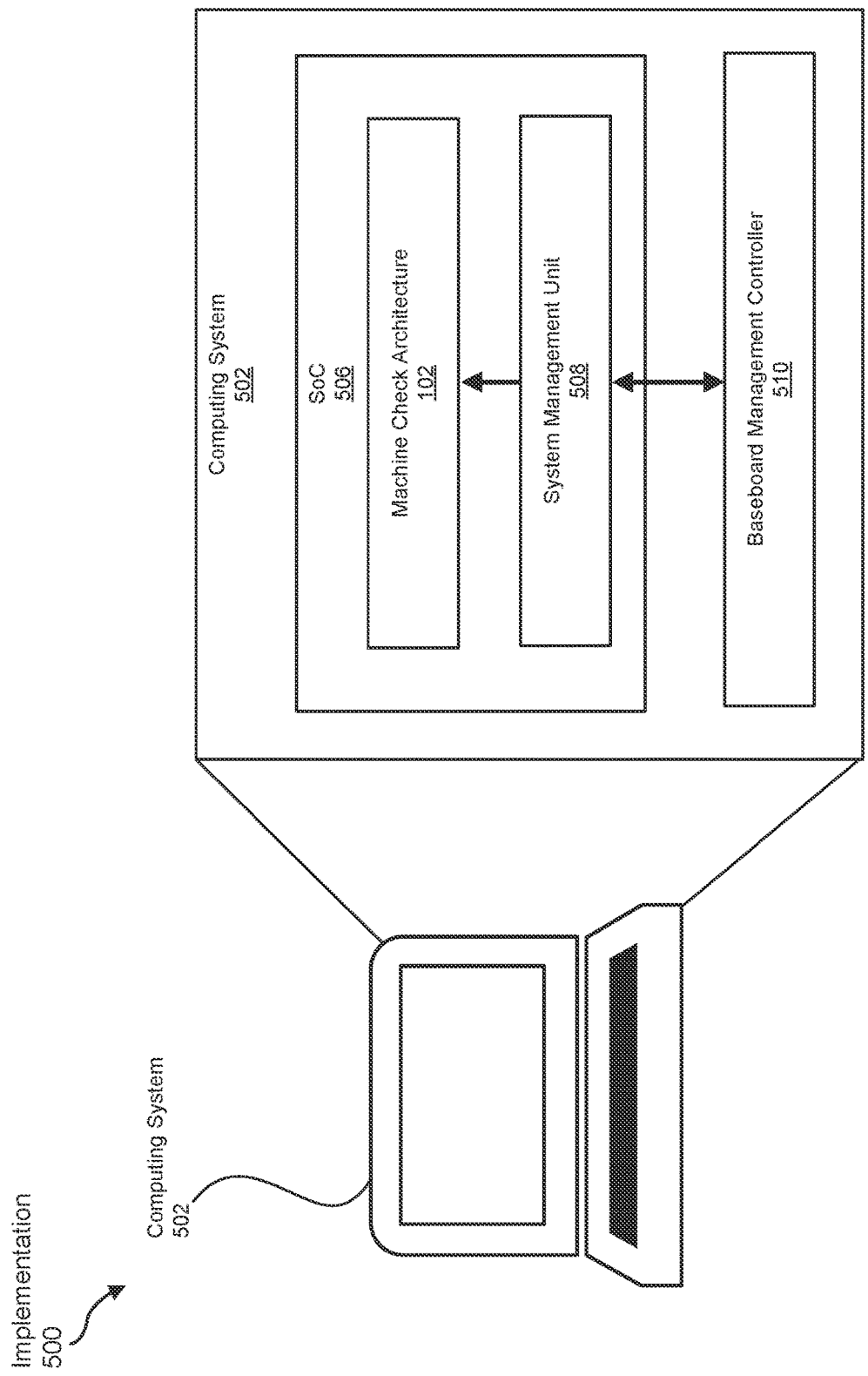
FIG. 5 is a block diagram of an exemplary implementation involving a computing system that facilitates out-of-band delivery of error reports according to one or more variations of this disclosure.

FIG. 5 illustrates an exemplary implementation 500 involving a computing system 502. In some examples, computing system 502 can include and/or represent certain components and/or features that perform and/or provide functionalities that are similar and/or identical to those described above in connection with any of FIGS. 1-4. As illustrated in exemplary implementation 500 in FIG. 5, computing system 502 includes and/or represents an SoC 506 equipped with machine check architecture 102 and/or a system management unit 508.

In some examples, computing system 502 also includes and/or represents a baseboard management controller 510 that is electrically and/or communicatively coupled to system management unit 508. In one example, system management unit 508 obtains, receives, and/or retrieves a copy of an error report from an out-of-band register in machine check architecture 102. In this example, baseboard management controller 510 then obtains, receives, and/or retrieves the copy of the error report from system management unit 508 for processing and/or to facilitate decision-making.

In some examples, the various devices and/or systems described in connection with FIGS. 1-5 and 7 can include and/or represent one or more additional circuits, components, and/or features that are not necessarily illustrated and/or labeled in FIGS. 1-5 and 7. For example, computing device 100 can also include and/or represent additional analog and/or digital circuitry, onboard logic, transistors, resistors, capacitors, diodes, inductors, switches, registers, flipflops, connections, traces, buses, semiconductor (e.g., silicon) devices and/or structures, processing devices, storage devices, circuit boards, packages, substrates, housings, combinations or variations of one or more of the same, and/or any other suitable components that facilitate and/or support out-of-band delivery of error reports. In certain implementations, one or more of these additional circuits, components, devices, and/or features can be inserted and/or applied between any of the existing circuits, components, and/or devices illustrated in FIGS. 1-5 and 7 consistent with the aims and/or objectives provided herein. Accordingly, the electrical and/or communicative couplings described with reference to FIGS. 1-5 and 7 can be direct connections with no intermediate components, devices, and/or nodes or indirect connections with one or more intermediate components, devices, and/or nodes.

In some examples, the phrase "to couple" and/or the term "coupling", as used herein, can refer to a direct connection and/or an indirect connection. For example, a direct coupling between two components can constitute and/or represent a coupling in which those two components are directly connected to each other by a single node that provides electrical continuity from one of those two components to the other. In other words, the direct coupling can exclude and/or omit any additional components between those two components.

Additionally or alternatively, an indirect coupling between two components can constitute and/or represent a coupling in which those two components are indirectly connected to each other by multiple nodes that fail to provide electrical continuity from one of those two components to the other. In other words, the indirect coupling can include and/or incorporate at least one additional component between those two components.

Figure 6:
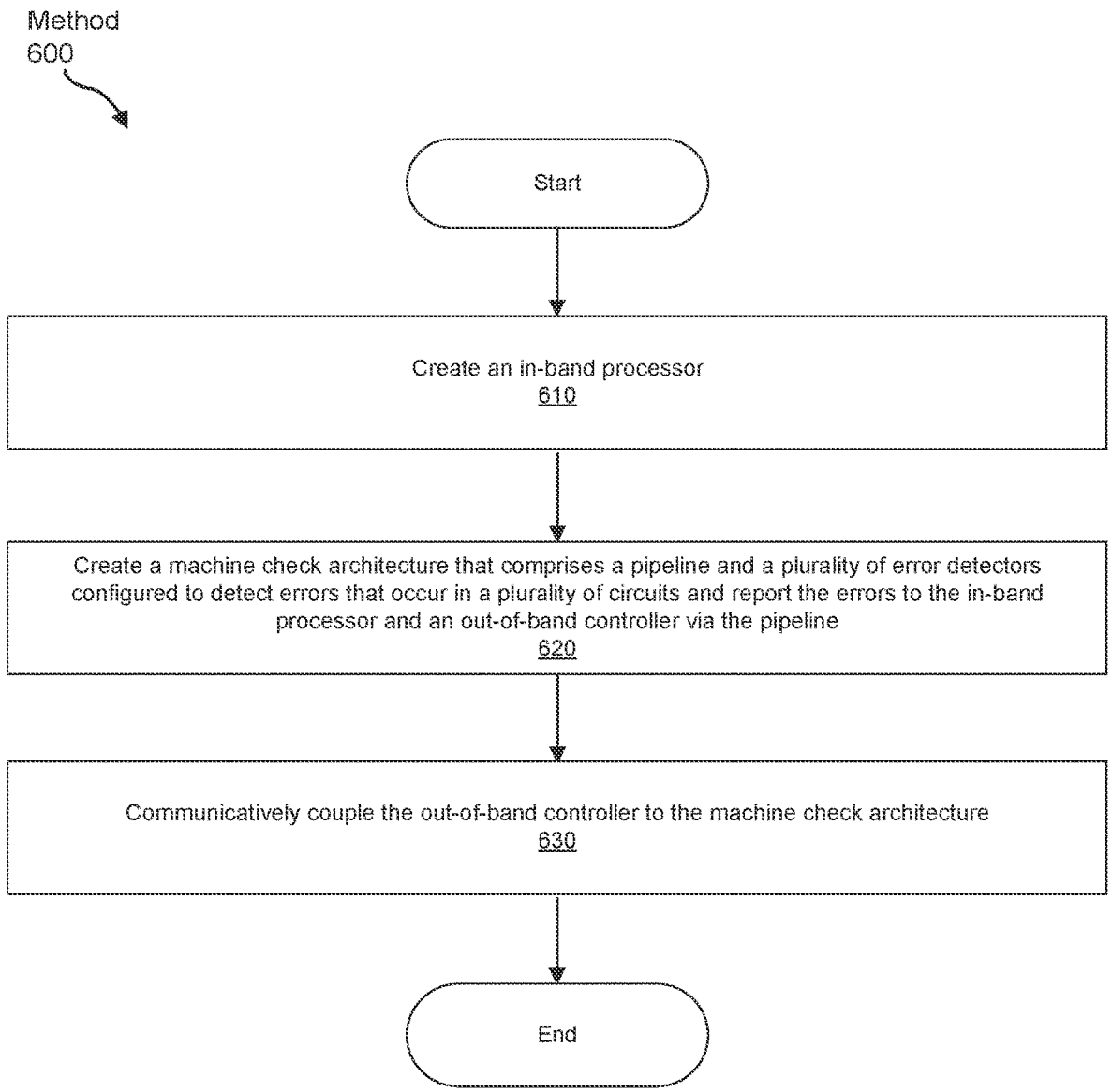
FIG. 6 is a flowchart of an exemplary method for out-of-band delivery of error reports according to one or more implementations of this disclosure.

FIG. 6 is a flow diagram of an exemplary method 600 for out-of-band delivery of error reports. In one example, the steps shown in FIG. 6 can be performed and/or executed during the manufacturing and/or assembly of a computing device and/or system. Additionally or alternatively, the steps shown in FIG. 6 can also incorporate and/or involve various sub-steps and/or variations consistent with the descriptions provided above in connection with FIGS. 1-5.

As illustrated in FIG. 6, exemplary method 600 include and/or involve the step of creating an in-band processor (610). Step 610 can be performed in a variety of ways, including any of those described above in connection with FIGS. 1-5. For example, a computing equipment manufacturer and/or subcontractor can create, manufacture, and/or produce an in-band processor.

Exemplary method 600 also includes the step of creating a machine check architecture that comprises a pipeline and a plurality of error detectors configured to detect errors that occur in a plurality of circuits and report the errors to the in-band processor and an out-of-band controller via the pipeline (620). Step 620 can be performed in a variety of ways, including any of those described above in connection with FIGS. 1-5. For example, the computing equipment manufacturer and/or subcontractor can create, manufacture, and/or produce a machine check architecture that comprises a pipeline and a plurality of error detectors configured to detect errors that occur in a plurality of circuits and report the errors to the in-band processor and an out-of-band controller via the pipeline.

Exemplary method 600 further includes the step of communicatively coupling the out-of-band controller to the machine check architecture (630). Step 630 can be performed in a variety of ways, including any of those described above in connection with FIGS. 1-5. For example, the computing equipment manufacturer and/or subcontractor can communicatively couple and/or connect the out-of-band controller to the machine check architecture.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality. Furthermore, the various steps, events, and/or features performed by such components should be considered exemplary in nature since many alternatives and/or variations can be implemented to achieve the same functionality within the scope of this disclosure.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the instant disclosure. The implementations disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computing device comprising:
   an in-band processor;
   an out-of-band controller; and
   a machine check architecture comprising:
      a pipeline; and
      a plurality of error detectors configured to:
         detect errors that occur in a plurality of circuits; and
         report the errors to the in-band processor and the out-of-band controller via the pipeline.

2. The computing device of claim 1, wherein the pipeline comprises:
   a unified lane configured to carry the error reports toward the in-band processor and the out-of-band controller; and
   a fork configured to split the unified lane into:
      a first lane that carries a first copy of the error reports toward the in-band processor; and
      a second lane that carries a second copy of the error reports toward the out-of-band controller.

3. The computing device of claim 2, wherein the machine check architecture comprises:
   at least one in-band register configured to:
      receive the first copy of the error reports via the first lane; and
      store the first copy of the error reports for access by the in-band processor; and
   at least one out-of-band register configured to:
      receive the second copy of the error reports via the second lane; and
      store the second copy of the error reports for access by the out-of-band controller.

4. The computing device of claim 3, wherein the in-band processor:
   is configured to access the first copy of the error reports via the in-band register; and
   is restricted from accessing the second copy of the error reports via the out-of-band register.

5. The computing device of claim 4, wherein the in-band processor comprises an operating system configured to obtain the first copy of the error reports from the in-band register.

6. The computing device of claim 3, wherein the out-of-band controller:
  is configured to access the second copy of the error reports via the out-of-band register; and
  is restricted from accessing the first copy of the error reports via the in-band register.

7. The computing device of claim 3, wherein the out-of-band controller comprises at least one of:
  a baseboard management controller; or
  a system management unit communicatively coupled to a baseboard management controller.

8. The computing device of claim 7, wherein the system management unit is configured to:
  access the second copy of the error reports via the out-of-band register; and
  provide the second copy of the error reports to the baseboard management controller.

9. The computing device of claim 7, further comprising:
  a first integrated circuit that includes the in-band processor, the machine check architecture, and the system management unit; and
  a second integrated circuit that is external to the first integrated circuit and includes the baseboard management controller.

10. The computing device of claim 1, wherein the in-band processor and the out-of-band controller are configured to make error-logging decisions independent of one another.

11. The computing device of claim 1, wherein the out-of-band controller is configured to instruct the machine check architecture to perform a specific action in response to a specific error detected in one of the circuits.

12. The computing device of claim 11, wherein the specific action comprises triggering an interrupt that notifies the out-of-band controller of the specific error.

13. A system comprising:
  a first integrated circuit that includes an out-of-band controller; and
  a second integrated circuit communicatively coupled the first integrated circuit, the second integrated circuit comprising:
    an in-band processor; and
    a machine check architecture comprising:
      a pipeline; and
      a plurality of error detectors configured to:
        detect errors that occur in a plurality of circuits; and
        report the errors to the in-band processor and the out-of-band controller via the pipeline.

14. The system of claim 13, wherein the pipeline comprises:
  a unified lane configured to carry the error reports toward the in-band processor and the out-of-band controller; and
  a fork configured to split the unified lane into:
    a first lane that carries a first copy of the error reports toward the in-band processor; and
    a second lane that carries a second copy of the error reports toward the out-of-band controller.

15. The system of claim 14, wherein the machine check architecture comprises:
  at least one in-band register configured to:
    receive the first copy of the error reports via the first lane; and
    store the first copy of the error reports for access by the in-band processor; and
  at least one out-of-band register configured to:
    receive the first copy of the error reports via the first lane; and
    store the second copy of the error reports for access by the out-of-band controller.

16. The system of claim 15, wherein the in-band processor:
  is configured to access the first copy of the error reports via the in-band register; and
  is restricted from accessing the second copy of the error reports via the out-of-band register.

17. The system of claim 16, wherein the in-band processor comprises an operating system configured to obtain the first copy of the error reports from the in-band register.

18. The system of claim 15, wherein the out-of-band controller:
  is configured to access the second copy of the error reports via the out-of-band register; and
  is restricted from accessing the first copy of the error reports via the in-band register.

19. The system of claim 15, wherein the out-of-band controller comprises at least one of:
  a baseboard management controller; or
  a system management unit communicatively coupled to a baseboard management controller.

20. A method comprising:
creating an in-band processor;
creating a machine check architecture that comprises:
  a pipeline; and
  a plurality of error detectors configured to:
    detect errors that occur in a plurality of circuits; and
    report the errors to the in-band processor and an out-of-band controller via the pipeline; and
communicatively coupling the out-of-band controller to the machine check architecture.

* * * * *